Nov. 19, 1963  J. KIBSGAARD  3,111,483
GRAIN CLEANER
Filed Jan. 5, 1961  2 Sheets-Sheet 1

John Kibsgaard
INVENTOR.

Nov. 19, 1963  J. KIBSGAARD  3,111,483
GRAIN CLEANER
Filed Jan. 5, 1961  2 Sheets-Sheet 2

John Kibsgaard
INVENTOR.

United States Patent Office 3,111,483
Patented Nov. 19, 1963

3,111,483
GRAIN CLEANER
John Kibsgaard, Box 67, Coulter, Iowa
Filed Jan. 5, 1961, Ser. No. 80,787
7 Claims. (Cl. 209—10)

This invention relates to devices for processing grain, and more specifically, it is directed to an apparatus for cleaning and fumigating grain.

Briefly, the invention comprises an elevating device for lifting grain into the upper portion of a hopper, providing means in the upper portion of the hopper for separating the grain as it falls downward, and at the same time blowing a blast of air over the grain to remove dust, dirt and insects therefrom. As the grain proceeds into the storage bin by gravity, means are provided for subjecting the grain to a fumigant for destroying insects therein.

It has been found from previous experience that when grain is processed for storage, grinding, etc., that a considerable amount of dust is given off therefrom. This results in a very unhealthy environment for those processing the grain. Accordingly, it is an object of this invention to remove the excess dust from grain thereby making the working conditions more healthful for those who process the grain at a later date.

It is well known that grain often becomes infested with various forms of insects such for example as the corn weevil. Accordingly, it is a further object of this invention to provide means for removing insects from the grain, and if any insects should remain within the grain, to provide means for killing same.

It is still a further object of this invention to improve the quality and value of grain by providing a means for removing dirt, dust, and other waste material therefrom.

It is a further object of this invention to reduce the probabilities of fires and explosions in grain processing factories caused by dust by providing a machine for removing the dust from grain before it is processed in these factories.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

The grain cleaning apparatus is enclosed in rectangular housing assemblies 10 and 12.

Figure 3:
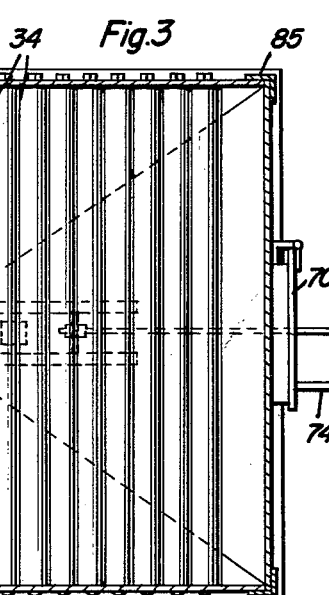
FIGURE 3 is a horizontal cross sectional view taken substantially on the plane of line 3—3 in FIGURE 2.
Figure 5:
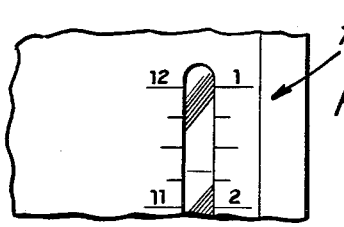
FIGURE 5 shows an enlarged view of a portion of the gage shown in FIGURE 1.

The housing 10 is substantially square in cross section as shown in FIGURE 3 and has a substantially semi-cylindrical top 16. Journaled in the upper portion of the side walls of this housing is a horizontally extending shaft 11 having spaced sprockets 18 rotatable thereon. Looped over the sprockets 18 is a vertically extending elevator chain assembly 14 which moves in a direction whereby the sprockets rotate clockwise. The chain is driven by a power source at its lower end, not shown. The chain is composed of a plurality of pivoted links 20. Every third link has a grain retaining cup 22 fixed thereto.

The upper end of the housing 12 has a grain cleaning chamber 24 therein and its upper end is sealed by means of a flanged top 26.

Extending between the parallel vertically extending walls 30 and 32 of the housing 12 are six rows of parallel and horizontally extending shafts or rods 33 which have their ends secured and fixed to the walls. Mounted on these rods and extending between the walls 30 and 32, are wooden roller members 34. The rods and rollers in each row are alternately staggered so that no straight line vertical passages are formed between the rollers.

Mounted just above the wooden rollers 34, is an inclined baffle plate 38 also extending between the walls 30 and 32 and secured thereto.

The lower portion of the housing 12 has mounted therein a generally inverted pyramidal hopper 36. Three walls of this hopper are formed by triangular sloping wall members 37 fixed together at their edges. The fourth and rear wall 38 of the hopper has a flanged opening 39 therein of circular shape which contains a fan 44 driven by a motor 42. A screen 40 covers the circular opening 39. The bottom of the hopper has an opening 46 therein which leads into an exhaust pipe 48 which empties into a storage bin 50.

The upper portion of the front wall 25 of the chamber 24 has a circular opening 27 therein which is closed by a screen 56 clamped to the wall by means of a circular support 52 formed from angle iron. The support 52 is fixed to the wall 25 by means of bolts 54 and has integrally secured thereto radial arms 64 which are connected to a motor support 62, 63. Mounted on the support 62 is a motor 60 which drives a fan 58.

Figure 1:
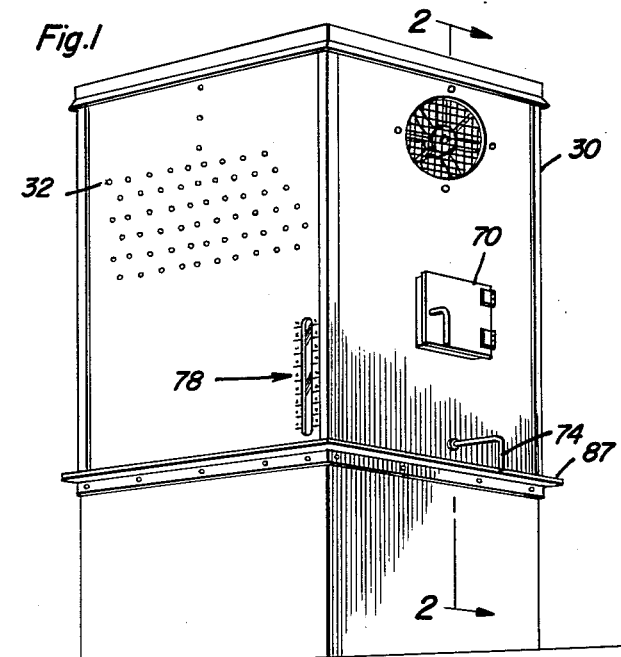
FIGURE 1 is an outside perspective view of my invention.
Figure 2:
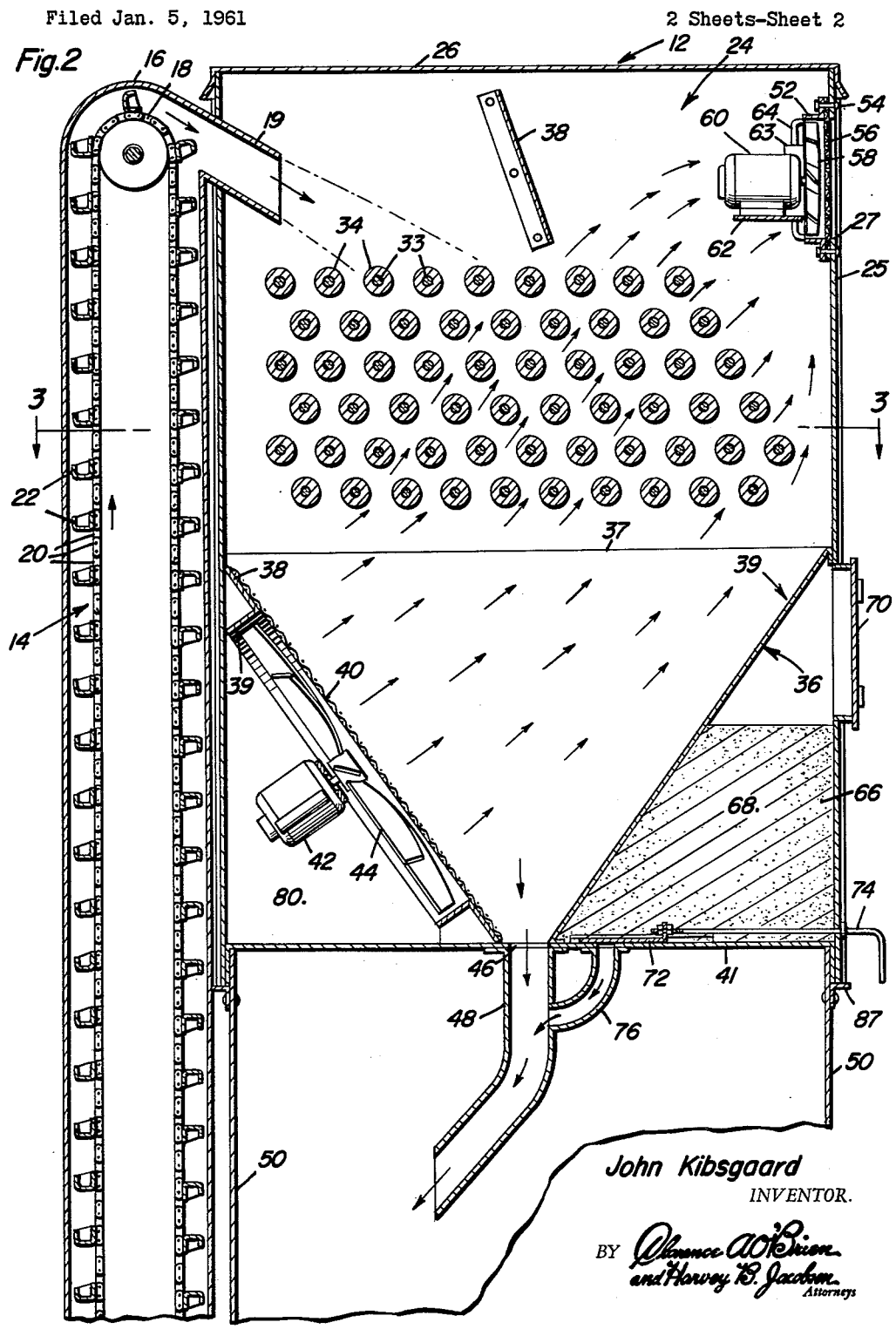
FIGURE 2 is an enlarged cross sectional view taken substantially on the plane of line 2—2 in FIGURE 1.

The lower end of the hopper 36 is supported on the bottom or floor 41 of the housing 12. The right portion of the floor 41 as shown in FIGURE 2 in combination with the hopper wall 39 and the housing wall 25 forms a triangular chamber 66 for retaining a fumigant 68. Access to the chamber 66 is gained by means of a hinged door 70. Leading from the bottom of the chamber 66 to the pipe 48 is a curved passage 76 having its upper entrance closed by a slide valve 72. The slide valve 72 may be operated by a rod 74 extending through a sealed aperture in wall 25. The wall 25 has a slot therein adjacent the chamber 66 which is covered by some transparent material such as glass, and the edges of the slot have indicating marks thereon as shown at 78 in FIGURE 1 for indicating how much fumigant 68 is in the chamber 66. The fumigant 68 is of a type available commercially and suitable for killing insects commonly found in grain. The fumigant may be in liquid or solid form. Alternatively, the fumigant could be in a gaseous state in which case, the chamber 66 would have to be hermetically sealed.

Figure 4:
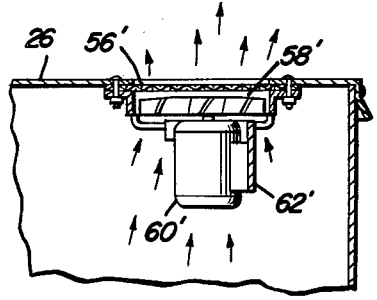
FIGURE 4 shows a modified form of the exhaust fan.

FIGURE 4 shows a modified mounting of the exhaust fan 58. The fan 58' and its mounting and various other parts are substantially identical to those shown in FIGURE 2. However, as shown in FIGURE 4, the fan is mounted in the top 26 of the chamber 24. The advantage of this modification, is that there is less likelihood of the fan becoming clogged or stalled with dirt or grain since the fan 58' is higher than the fan 58, and if the grain should tend to pile up in the chamber 24, it obviously would have more difficulty in reaching fan 58' than it would fan 58.

The fan chamber 80 for fan 44 has filtered air inlet passages, not shown, on opposite sides of the housing 10.

In operation, the left column of cup-shaped members 22 as shown in FIGURE 2 are moved upwardly by chain 14 whereby the grain is dumped into chute 19 and exited into chamber 24. Sloping baffle 38 prevents the grain from entering fan 58, and the slope of the baffle prevents the grain from piling thereagainst.

As the grain strikes the wooden rollers or baffles 34, the resiliency and softness inherent in the wood prevents the grain from being cracked or damaged.

Due to the staggered nature of the rollers, the grain is forced to separate and follow a zigzag passage down through the rollers towards the hopper 36. As the grain falls downwardly through the rollers, the fan 44 blows a powerful stream of air over this grain thereby removing all dust, dirt and most insects therefrom. The exhaust fan 58 creates a suction therebehind and additionally increases the velocity and volume of air flowing over the grain. Since only filtered air enters chamber 24, the grain cannot be contaminated by incoming air. All foreign matter removed from the grain is exhausted through screen 56. As the grain flows down through the hopper and into pipe 48, the slide valve 72 may be opened the desired amount for admitting fumigant into the grain. The fumigant and grain then discharge into the storage bin 50 where the fumigant remains in contact with the grain for a sufficient period of time to insure that all insects therein are eliminated.

It is contemplated that over a period of time the fumigant will evaporate from the grain leaving it in a free, clean, and sanitary state. If desired, the bin 50 may be provided with ventilating openings for gradual release of the fumigant therein. The gage 78 at all times indicates the amount of fumigant in chamber 66.

The vertical walls of the housing 12 are connected together at their edges by means of angle irons 85 which may be secured to the walls by means of rivets, not shown. The storage bin 50 has horizontally extending angle irons 87 riveted thereto for supporting the housing 12 on their upper flanges.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A grain processing apparatus comprising, in combination, a housing, a multiplicity of spaced staggered baffles mounted horizontally in an intermediate portion of the housing, means for discharging grain into the housing above the baffles to flow downwardly by gravity therebetween, a hopper in the lower portion of the housing for receiving the grain, said hopper having an outlet opening in its lower portion, and means for blowing a stream of air through the descending grain for cleaning same, said baffles including rollers extending between opposed walls of the housing.

2. A grain processing apparatus comprising, in combination, a housing, a multiplicity of spaced staggered baffles mounted horizontally in an intermediate portion of the housing, means for discharging grain into the housing above the baffles to flow downwardly by gravity therebetween, a hopper in the lower portion of the housing for receiving the grain, said hopper having an outlet opening in its lower portion, and means for blowing a stream of air through the descending grain for cleaning same, said baffles including rods extending between opposed walls of the housing, and rollers journaled on said rods.

3. The combination of claim 2, said air blowing means comprising an upwardly and forwardly directed intake fan in said lower portion of the housing, and an exhaust fan in said upper portion of said housing.

4. A grain processing apparatus comprising, in combination, a housing including a bottom having a grain outlet opening therein, means for discharging grain into the upper portion of the housing to flow downwardly by gravity therein, means for cleaning the descending grain, a hopper in the lower portion of the housing for receiving the cleaned grain, a discharge pipe depending from the housing bottom and communicating with the hopper through the opening for receiving the grain by gravity from said hopper, means for fumigating the grain as it flows through the discharge pipe, and a multiplicity of elongated, spaced, parallel and staggered baffles mounted in an intermediate portion of the housing for dispersing the descending grain, said baffles including rods extending between spaced walls of the housing, and wooden rollers journaled on said rods.

5. The combination of claim 4, the last-named means including a fumigant chamber in said lower portion of the housing adjacent the hopper, and a pipe communicating the chamber with the discharge pipe for delivering a fumigant thereinto by gravity.

6. The combination of claim 4, said last-named means further including a slide valve in the chamber for controlling the fumigant pipe.

7. The combination of claim 4, wherein said cleaning means comprises a screened, upwardly inclined intake fan mounted in the hopper, and an exhaust fan mounted in the upper portion of the housing.

References Cited in the file of this patent

UNITED STATES PATENTS

| Re. 15,275 | Mettler | Oct. 26, 1920 |
|---|---|---|
| 938,702 | Porbeck | Nov. 2, 1909 |
| 1,085,921 | Lakey | Feb. 3, 1914 |
| 1,963,501 | Mitchell | June 19, 1934 |
| 2,461,649 | Manning | Feb. 15, 1949 |

FOREIGN PATENTS

| 156,555 | Germany | Aug. 4, 1903 |
|---|---|---|
| 244,153 | Italy | Feb. 12, 1926 |